July 2, 1957 W. T. WAGNER 2,797,442
FOAM RUBBER MOLD CONSTRUCTION
Filed April 2, 1953 2 Sheets-Sheet 1

INVENTOR.
WILLIAM T. WAGNER
BY
ATT'Y.

July 2, 1957     W. T. WAGNER     2,797,442
FOAM RUBBER MOLD CONSTRUCTION

Filed April 2, 1953     2 Sheets-Sheet 2

*INVENTOR.*
WILLIAM T. WAGNER
BY
ATT'Y.

United States Patent Office 2,797,442
Patented July 2, 1957

2,797,442

FOAM RUBBER MOLD CONSTRUCTION

William T. Wagner, Dayton, Ohio, assignor, by direct and mesne assignments, of one-half to The Dayton Rubber Company, a corporation of Ohio, and one-half to The B. F. Goodrich Company, Akron, Ohio, a corporation of New York Application April 2, 1953, Serial No. 346,503

15 Claims. (Cl. 18—39)

The present invention relates to an improved apparatus for the molding of foam rubber articles and is a continuation-in-part of applicant's co-pending application No. 323,780, filed December 3, 1952.

In the molding of products from frothed latex dispersions, as for example according to the method described in United States Patent No. 2,432,353 to Talalay, it is necessary that the cavity into which the latex composition is cast be at least partially surrounded by a heat exchange or heat transfer fluid in order that the composition while within the mold and during its coagulation may be maintained in a frozen state. In order to accomplish this purpose a labyrinth chamber, adapted to accommodate a fluid refrigerant, is ordinarily provided in the hollow-walled portions of the mold. In addition to the provisions for thus circulating a refrigerant through the portions of the mold surrounding the cavity thereof, it has been found expedient to utilize this same heat transfer chamber to vulcanize the coagulated latex composition by passing hot air or steam therethrough.

The penetrating nature of the fluids employed for the refrigerating or vulcanizing of foam rubber articles in such molding apparatuses, the necessary close proximity of these fluids to the mold cavity and the foam rubber composition therewithin, and the expansion and contraction of the metallic mold members accompanying the change from cold to hot fluids all present a serious problem in that the fluids tend to leak from the labyrinth heat transfer chamber into the mold cavity proper, there to contact the latex composition to its serious damage. This problem is particularly severe in the conventional multi-cavity or multi-decker molds wherein a plurality of mold members and pin plate members are superimposed in alternating fashion to form a series of superimposed cavities. Because the labyrinth heat transfer chamber in this type of mold is not enclosed by an integral construction but rather involves separable parts, a fluid type seal at the juncture of these parts is frequently difficult to achieve.

An additional problem involved in the use of hollow-walled molds for the manufacture of foam rubber articles according to the procedures herein considered is the volume of heat transfer fluid ordinarily required to maintain uniform circulation thereof through the entire heat exchange chamber so that the mold walls immediately surrounding the cavity will become uniformly cooled and heated. In addition to the additional weight, and the additional heat and/or "cold" energy required to maintain a system utilizing a large volume of the heat transfer fluid, there is the additional disadvantage in multi-decker mold assemblies that the presence of a large volume of heat exchange fluid represents a considerable potential danger to the rubber-like composition within all of the cavities in the entire mold construction.

It is accordingly an object of the present invention to provide a satisfactory molding apparatus for the manufacture of foam rubber articles.

It is an additional object of the present invention to provide a multi-cavity mold construction of alternatingly superimposed mold cavity members and pin plate members arranged to provide a plurality of mold cavity closures and heat transfer chambers surrounding the same.

It is a further object of the present invention to provide such a mold construction wherein the pin plate members are provided with depending core pins which are adapted to extend into the foam rubber composition within the mold when such pin plates are in operative engagement with the mold members.

It is yet a further particular object of the present invention to provide a multi-decker mold construction of assembled pin plates and mold cavity members wherein the heat transfer chamber is adapted to carry a heat exchange fluid around the mold cavity and wherein a novel gasketing and core pin mounting arrangement is provided to prevent leakage of the heat exchange fluid from the labyrinth chamber into the mold cavity.

It is yet a further object of the present invention to provide a multi-decker, hollow-walled mold assembly wherein the volume of heat exchange fluid necessary for refrigeration or vulcanization conditions is substantially reduced.

It is proposed to achieve these and other obvious objects and advantages of the present invention by providing an assembly of mold cavity members having upwardly opening cavity walls and web portions depending therefrom to form a heat exchange fluid labyrinth, pin plates adapted to be affixed to the bottom of said web portions thereby enclosing the labyrinth heat exchange chamber and top and bottom closure members wherein said mold cavity members and said pin plate members may be superimposed in alternating relation between said closure members thereby forming a multi-cavity mold construction. In this type of construction, the heat transfer chamber will provide the necessary heat or "cold" energy immediately surrounding the cavity of its respective mold member and, at the same time, will act as a heat exchange chamber immediately above the cavity formed by its closing upon the mold member immediately therebelow. The basic structural component in this type of assembly might therefore be considered as comprising one mold cavity member wherein the web portions depending therefrom form an open labyrinth portion, a substantially planar pin plate member adapted to be fastened to said depending web portions across their exposed ends thereby closing the labyrinth chamber, and headed fastening means passing through holes in the pin plate member into recesses within the web portion so as to fix the pin plate member in closing position on the labyrinth chamber.

One modification of this basic structural component to be considered in the present disclosure is such a unit wherein the pin plate member is adapted to carry a plurality of hollow core pins on its surface away from the labyrinth chamber, said core pins being inserted into trepanned channels some of which surround the heads of said fastening members and, of course, the apertures through which they pass. While there may be more core pins than fastening members, it is contemplated that all of the headed fastening members will be surrounded by the hollow core pins inserted into the trepanned grooves. The nature of this connection between the hollow core pins and the pin plates completely encircling the apertures through said pin plates cooperates with gasketing means which may be arranged at the parting line between the lower end of the labyrinth web portions and the pin plates. These gasketing means will likewise surround the fastening members and the apertures in the pin plates through which they pass. Additional gasketing means in the form of compressible washers surrounding the fastening members at the point between the heads thereof and their seats upon the pin plate may be provided.

A second modification of this basic structural component of the multi-cavity mold assembly considered herein comprises a plurality of hollow fluid displacement tubes arranged in spaced relation within the labyrinth heat exchange chambers to occupy a considerable portion of the space within said chambers, thereby reducing the volume of heat transfer fluid required to fill them. In addition to reducing the potential danger of damage to the material within the mold cavities which would accompany the use of a large volume of heat transfer fluid, the provision of these displacement tubes reduces the time involved in changing the heat transfer chambers from refrigerating to vulcanizing conditions.

Figure 1:
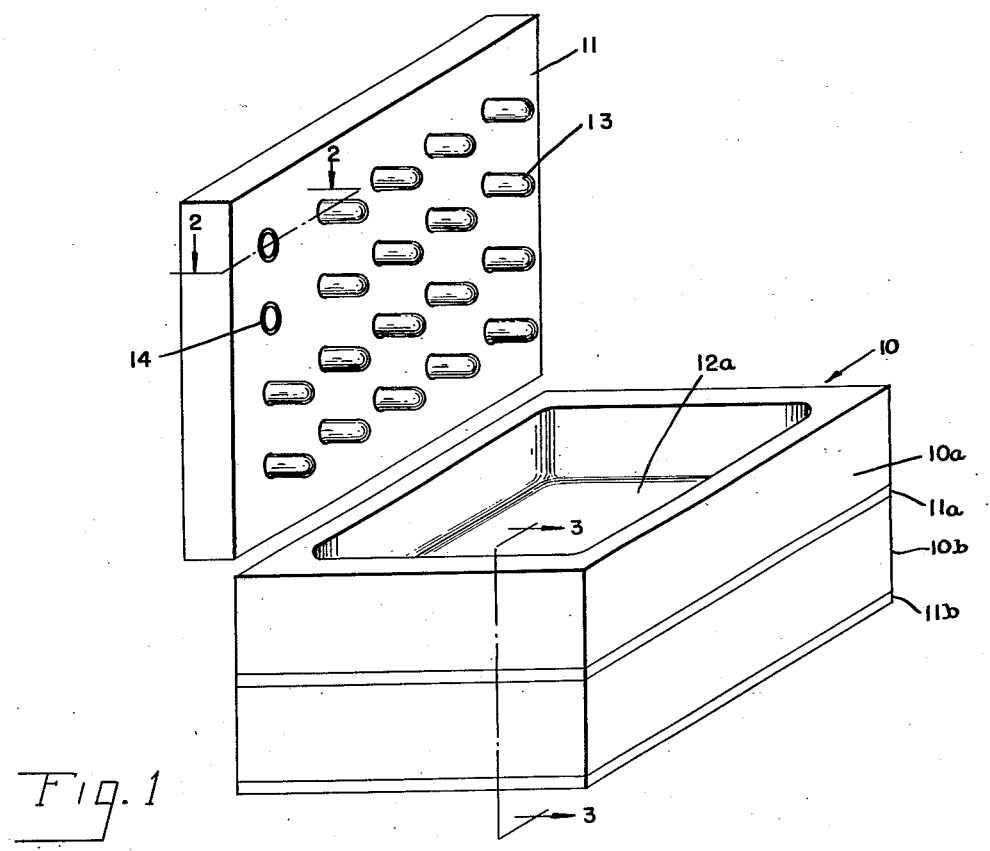
Figure 1 is a view in perspective of a foam rubber mold assembly incorporating the features of this invention.

In the perspective of Figure 1, there is shown a typical mold assembly 10 wherein the top closure member 11 is adapted to close upon the mold assembly and to completely confine a foam rubber composition within the cavity 12a. To the top closure member 11 are mounted hollow core pins 13 which are fastened to the closure member by their insertion into anular grooves 14 which may be formed by an operation known as trepanning. The core pins 13 are so mounted that which the mold is closed, they will depend from the top closure member into the cavity 12a there to displace the foam rubber composition within the cavity, thereby controlling its density and at the same time, transmitting the heat and/or "cold" of the mold members to the interior of the foam rubber composition.

Figure 2:
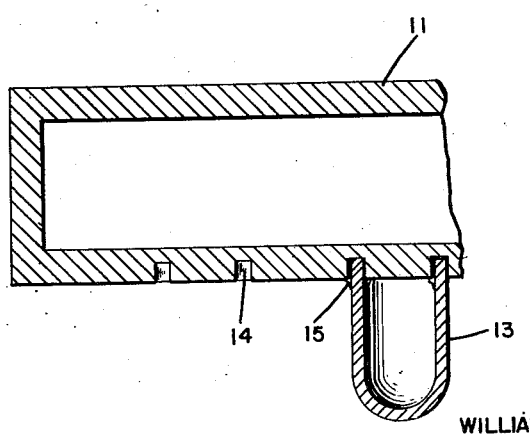
Figure 2 is an enlarged cross-section on line 2—2 of Figure 1.

The nature of the mounting of the core pins upon the top closure member is best shown in Figure 2 where the trepanned grooves 14 are shown to be substantially rectangular in cross-section. To secure the hollow core pins 13 in fixed position within the grooves, a heat-hardening, thermo-setting resinous adhesive 15 may be applied to the grooves and to the portions of the pins to be inserted therein. Since the joint between the pins and the grooves in the top closure member will be protected from the refrigerating fluid circulating within the hollow walls of the mold member, the adhesive employed need not have any particular resistance to solvents and other fluids to be employed therein. On the other hand, since the mold will be repeatedly subjected to vulcanizing temperatures of the order of 300 degrees F., the adhesive chosen should have good resistance to heat as well as good metal-to-metal bonding properties. Adhesive compositions suitable for this application include solutions or dispersions of the phenolic resins such as the phenol-aldehyde resins, urea-aldehyde resins, melamine resins, polyester resins, epoxy resins, furan, and the like. To increase the conductivity of the adhesive employed in this construction, it may be desirable to admix therewith a metallic dust, such as aluminum dust or powder in proportions of from 10 to 50 parts by weight based upon the weight of the adhesive material. Instead of using an adhesive composition, the trepanned grooves may be cut slightly undersized and the core pins wedged or forced into the grooves so as to give a forced fit. The depth of the recesses 14 should not exceed say, three-fourths of the thickness of the mold wall so that the walls will not be weakened by a plurality of closely spaced apertures.

Figure 3:
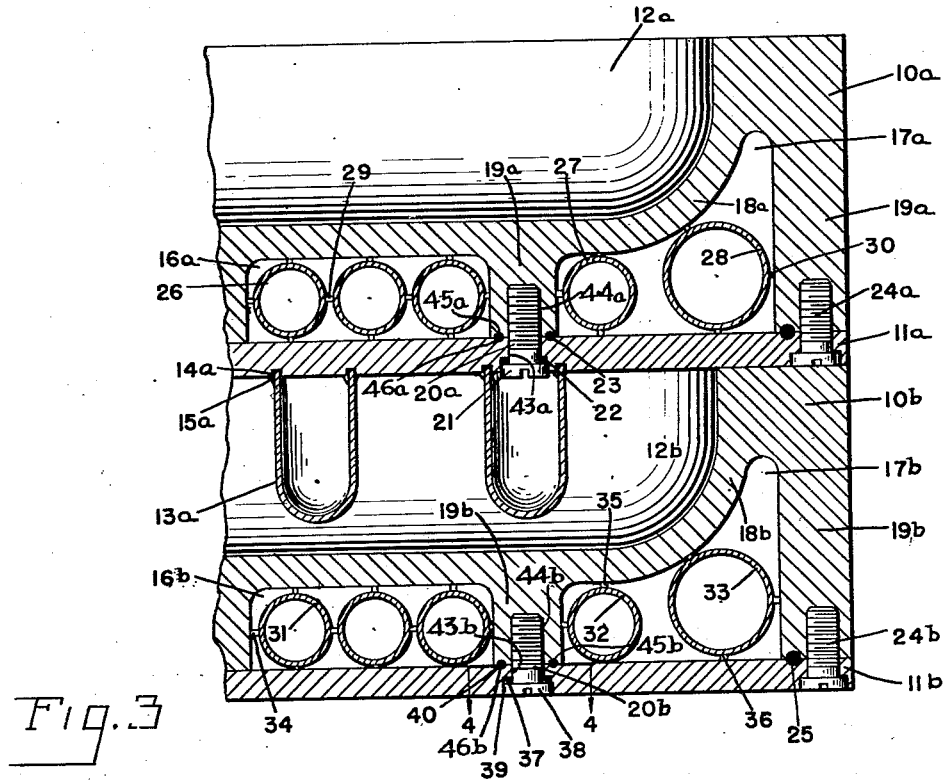
Figure 3 is a cross-sectional view of the mold assembly on line 3—3 of Figure 1.

The remainder of the mold assembly of Figure 1 is shown in cross-section in Figure 3, wherein upper and lower mold cavity members 10a and 10b respectively are shown in superimposed relation, separated by pin plate member 11a. A second pin plate member 11b is fastened to the bottom of the lower mold member 10b. Included within the mold cavity members are dished cavity portions 12a and 12b respectively; and mounted to the pin plate member 11a are hollow core pins 13a lodged in trepanned grooves 14a and there adhered by a thermosetting resinous adhesive 15a in a manner similar to that previously described in connection with the mounting of the core pins upon the top closure member 11 of Figure 2. Also included within the mold cavity members are the labyrinth heat transfer chambers 16a, 16b, 17a and 17b formed by the cavity walls 18a and 18b and web portions 19a and 19b depending therefrom. These heat transfer chambers are completely enclosed by the mounting of pin plates 11a and 11b across the bottom of the mold members. As best shown in Figure 3, this mounting is effected by headed fastening means 20a, 20b, 24a and 24b passing through spaced apertures 43a and 43b within the pin plate members and into cooperative threaded recesses 44a and 44b extending into the web portions of the mold members.

In a preferred form of the present invention, the fastening members connecting the pin plates to the web portions depending from the cavity walls are shown in Figure 3 to comprise cap screws having headed portions 21 and 38.

Figure 4:
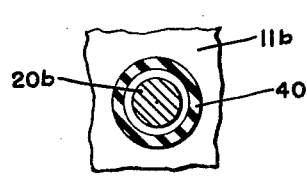
Figure 4 is a horizontally cross-sectioned view of an O-ring joint taken on line 4—4 of Figure 3.

In order that the fluid passing through the heat transfer chambers 16a, 16b, 17a and 17b will not escape through the apertures provided for the fastening means connecting the pin plates to the mold cavity members, annular groves 45a and 45b are provided at the lower end of the web portion and annular grooves 46a and 46b are provided at the upper surface of the pin plate members. Upon closure of the latter upon the mold cavity members, these grooves will be aligned to form a toroidal passage encircling the fastening members and the apertures and recesses provided for the receipt of same. Into these toroidal passages may be inserted a deformable annular gasket, one preferred example being a neoprene O-ring, such as 23 and 40. The manner in which such a gasket encircles the possible points of fluid leakage around the fastening members is best shown in Figure 4.

As further protection against leakage of the fluid from the heat exchange chambers into the mold cavity portions, washers 22 and 37, likewise encircling the fastening means, may be located between the heads 21 and 38 thereof and the countersunk seats provided therefor in the pin plate members 11a and 11b. These washers are preferably of a compressible composition and those composed of a laminated nylon fabric impregnated with neoprene have been found particularly suitable. In order that the washer, upon tightening of the fastening means will not extrude, the countersunk recesses in the pin plate members adapted to receive the head of the fastening means should be of substantially the same dimensions as the head of said fastening means so that the heads will fit snugly against the walls of the apertures in the pin plate as at 39.

Finally, in accordance with the present invention, the fastening means such as 20a and 20b may be further surrounded by the hollow core pins such as 13a which are mounted in trepanned grooves encircling the fastening means. In the event that any of the fluid from the heat transfer chamber should escape through the gasket and washer construction provided, it is apparent that the same would be entrapped within the interior of the hollow core pins 13a and would accordingly cause no damage to the foam rubber composition within the mold cavities.

Figure 5:
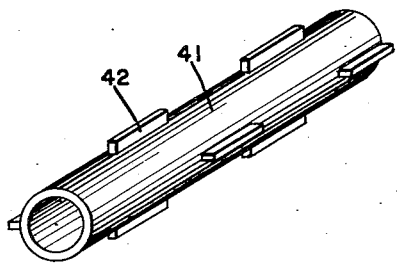
Figure 5 is a perspective of a typical displacement tube to be inserted in the heat transfer chamber of the mold assembly of the present invention.

Included within the heat transfer chambers 16a, 17a, 16b and 17b, are shown displacement tubes 26, 27, 28, 31, 32 and 33, spaced from each other and from the walls of the mold cavity member by spacing bars such as 29, 30, 34, 35 and 36. These displacement tubes will be closed at their ends so that they may be kept free from the fluid passing within the heat transfer chamber, thereby reducing the amount of such fluid required to completely occupy and uniformly contact the surfaces of these heat transfer chambers. Because the heat transfer fluid thus required to completely fill the chambers will be reduced, the total amount of heat or "cold" energy required to effect changes in the temperature of the mold members, particularly the mold cavity walls and the pin plates, will be likewise reduced on the time required to change the temperature of these mold members from hot to cold, or vice vera, will also be considerably shortened. An example of such a tube is shown at 41 in Figure 5 wherein the spacing bars 42 are affixed thereto in axially staggered relation so as to allow passage of the heat transfer fluid around the tubes.

In addition to the gasketing and washer constructions provided around the fastening means connecting the pin plates to the mold cavity members, a deformable gasket in the form of the neoprene noodle 25 may be placed about the periphery of the heat transfer chamber within a passage provided at the plane of juncture between the mold cavity members and the pin plates.

While the present disclosure has made reference to a labyrinth type heat transfer chamber, it is apparent that any type of heat transfer chamber such as would be included in a hollow-walled mold member devoid of any intermediate web portions or in a mold member having any arrangement of web portions, continuous or otherwise, is within the scope of this invention. Similarly, the fluid displacement members adaptable to the present invention might include a variety of configurations, hollow or otherwise, in addition to the hollow tubes set forth as one preferred example. In a like manner, it is to be understood that all references to specific embodiments and examples herein have been for descriptive purposes only and are not to be construed as limiting the scope of this invention as defined in the claims.

I claim:

1. An apparatus for the manufacture of foam rubber articles comprising a first mold cavity member, an upwardly opening cavity wall within said mold cavity member, web portions depending from said cavity wall, a first pin plate member positioned across the bottom of said first mold cavity member and spaced therefrom by said web portions thereby enclosing a heat transfer fluid chamber contiguous to said cavity wall, spaced seated apertures through said pin plate member, similarly spaced recesses in the lower ends of said web portions, headed fastening means passing through said apertures and into said recesses thereby securing said first pin plate member to said web portions, cooperative annular grooves in said pin plate member and said web portions forming a toroidal passage encircling said apertures and said fastening means, a deformable toroidal gasket occupying said passage, a compressible washer positioned between the head of said fastening means and the seat of the apertures in said first pin plate member, a second pin plate member positioned above said first mold cavity member a second mold cavity member positioned below said first pin plate member, and a base plate positioned below said second mold cavity member, thereby defining a double cavity mold construction wherein each of the cavities is in close proximity to a heat transfer fluid chamber.

2. An apparatus according to claim 1 wherein the heads of said fastening means are surrounded by trepanned grooves formed in the first pin plate having hollow core pins inserted therein.

3. An apparatus according to claim 1 wherein the heat transfer fluid chamber is partially occupied by fluid displacement members in spaced relation with said web portions, said first pin plate member, said cavity wall and with each other.

4. An apparatus according to claim 1 wherein the heads of said fastening means, the compressible washers and the apertures through said first pin plate member are of substantially equal diameter whereby extrusion of the washer is limited.

5. An apparatus according to claim 1 wherein said toroidal gasket is composed of a rubber-like composition.

6. An apparatus according to claim 5 wherein said toroidal gasket is composed of neoprene.

7. An apparatus according to claim 1 wherein said compressible washers are composed of superimposed laminae of nylon fabric impregnated with a rubber-like composition.

8. An apparatus according to claim 7 wherein said rubber-like composition is polychloroprene.

9. An apparatus according to claim 1 wherein a gasket occupies a passage spaced from and following the periphery of said first pin plate member and formed by the uniform contact thereof with the peripheral web portions of said first mold cavity member to which it is affixed.

10. An apparatus for the molding of foam rubber articles comprising a base plate, a mold cavity member superimposed thereon, an upwardly opening cavity wall within said mold cavity member, web portions depending from said cavity wall, and engaging the upper surface of said base plate to define a heat transfer chamber between said cavity wall and said base plate, spaced seated apertures through said base plate, similarly spaced recesses in the bottom of said web portions, headed fastening means passing through said apertures and into said recesses thereby securing said base plate to said web portions and sealing said heat transfer chamber, cooperative annular grooves in said base plate and said web portions forming a toroidal passage encircling said apertures and said fastening means, a deformable toroidal gasket occupying said passage, a compressible washer positioned between the head of said fastening means and the seat of said apertures, and a top closure member positioned above said cavity wall.

11. An apparatus according to claim 10 wherein said top closure member is a plate member carrying a plurality of depending core pins adapted to fit into the cavity formed by said cavity wall.

12. An apparatus according to claim 10 wherein said top closure member is a hollow-walled box-like structure having an inner heat transfer chamber and a plurality of core pins mounted upon its lower surface.

13. An apparatus for the molding of foam rubber articles comprising a mold member having an upwardly opening cavity wall, web portions depending from said wall to form a heat transfer chamber, a pin plate affixed by counter-sunk headed fastening means to the lower extremities of said web portions to enclose said heat transfer chamber, cooperative annular grooves encircling the headed fastening means at the plane of contact between the pin plate and the web portion extremities, a deformable gasket occupying the cavity formed by said grooves, a plurality of spaced trepanned recesses on the side of said pin plate away from said heat transfer chamber some of which encircle the fastening means, and a plurality of hollow core pins attached to said pin plate by insertion into and affixation within said trepanned recesses wherein a plurality of such mold members and pin plates may be nested with the core pins of one pin plate extending into the cavity of the mold member immediately underlying the same to form a multi-cavity mold structure.

14. A multi-cavity mold construction comprising a base plate, a first mold cavity member superimposed thereon, a pin plate member positioned above said mold cavity member, a second mold cavity member superimposed thereon, a second pin plate member positioned above said second mold cavity member, a hollow-walled top closure member located above said second mold cavity member, a cavity defining wall within each of said mold cavity members, web portions depending from each of said cavity walls, spaced seated apertures through said pin plate members, similarly spaced recesses in the lower ends of said web portions, headed fastening means passing through said apertures and into said recesses fastening said pin plate members against said mold cavity members, heat transfer chambers overlying said pin plate members and surrounding the cavity walls of said mold cavity members, cooperative grooves on the lower ends of said web portions on the upper surface of said pin plate members forming a passage encircling said recesses and apertures and said fastening means passing therethrough, a compressible gasket occupying said passage, compressible washers encircling said fastening means and positioned between the heads thereof and the seats of said apertures, spaced trepanned grooves on the lower surfaces of said pin plate members and said top closure members some of which trepanned grooves encircle the heads of said fastening means, hollow core pins fixed within said trepanned grooves and depending from said lower surfaces into said mold cavity members and a plurality of spaced displacement tubes positioned within said heat transfer chambers and the hollow walls of said top closure member.

15. In a hollow core pin heat exchange type mold construction wherein a plate is affixed by headed fastening means to web portions depending from a mold cavity member defining a labyrinth fluid chamber, that improvement which comprises a toroidal gasket positioned in cooperative channels on the upper surface of the plate and the lower end of said web portions forming a toroidal passage encircling said fastening means, a compressible washer positioned between the head of said fastening means and said plate, and a hollow core pin fitted into a trepanned channel surrounding the head of said fastening means whereby leakage of the heat transfer fluid from within the labyrinth chamber into the mold cavity is prevented.

References Cited in the file of this patent
UNITED STATES PATENTS

| | | |
|---|---|---|
| 1,229,873 | Bowers | June 12, 1917 |
| 1,760,283 | Pedersen | May 27, 1930 |
| 2,000,430 | Willshaw et al. | May 7, 1935 |
| 2,145,731 | Minor | Jan. 31, 1939 |
| 2,250,196 | Honderich | July 22, 1941 |
| 2,349,143 | Chute et al. | May 16, 1944 |
| 2,351,529 | Luxenberger et al. | June 13, 1944 |
| 2,661,498 | Blaurock | Dec. 8, 1953 |

FOREIGN PATENTS

| | | |
|---|---|---|
| 672,468 | Great Britain | May 21, 1952 |